United States Patent [19]

Lokkesmoe et al.

[11] Patent Number: 4,971,714

[45] Date of Patent: * Nov. 20, 1990

[54] DETERSIVE SYSTEM WITH AN IMPROVED HARDNESS ION COMPLEXING AGENT

[75] Inventors: Keith D. Lokkesmoe, Burnsville; Richard B. Greenwald, Eagan; Daniel J. Donovan, St. Paul, all of Minn.

[73] Assignee: Ecolab Inc., St. Paul, Minn.

[*] Notice: The portion of the term of this patent subsequent to Mar. 27, 2007 has been disclaimed.

[21] Appl. No.: 277,900

[22] Filed: Nov. 30, 1988

[51] Int. Cl.$^5$ .......................... C11D 3/39; C11D 7/24; C11D 17/00

[52] U.S. Cl. ........................ 252/95; 252/99; 252/135; 252/142; 252/174.13; 252/174.14; 252/174.16; 252/174.23; 252/175; 252/174.13; 252/181; 252/309; 252/544; 252/DIG. 14; 252/155

[58] Field of Search ............... 252/90, 95, 99, 135, 252/142, 145, 174.16, 174.23, 175, 181, 309, 544, 174.13, 155, DIG. 14

[56] References Cited

U.S. PATENT DOCUMENTS

| | | | |
|---|---|---|---|
| Re. 28,002 | 4/1971 | Li et al. | 210/22 |
| Re. 30,179 | 12/1979 | Li et al. | 210/22 |
| 3,389,078 | 6/1968 | Elzinga et al. | 208/308 |
| 3,410,794 | 11/1968 | Li | 208/308 |
| 3,617,546 | 11/1971 | Li et al. | 210/22 |
| 3,637,488 | 1/1972 | Li et al. | 210/22 |
| 3,740,315 | 6/1973 | Li et al. | 195/2 |
| 3,779,907 | 12/1973 | Li et al. | 210/22 |
| 3,923,678 | 12/1975 | Kleiner et al. | 252/89 |
| 3,969,265 | 7/1976 | Singhal et al. | 252/309 |
| 4,081,369 | 3/1978 | Li et al. | 210/22 |
| 4,086,163 | 4/1978 | Cahn et al. | 210/22 |
| 4,151,076 | 4/1979 | Reinhardt et al. | 210/21 |
| 4,183,960 | 1/1980 | Asher et al. | 424/365 |
| 4,235,713 | 11/1980 | Nogueira et al. | 210/638 |
| 4,259,189 | 3/1981 | Li | 260/29.6 |
| 4,287,071 | 9/1981 | DiGiacomo | 210/643 |
| 4,292,181 | 9/1981 | Li et al. | 210/638 |
| 4,334,999 | 6/1982 | Cornwell | 210/638 |
| 4,337,225 | 6/1982 | Dines | 423/10 |
| 4,362,642 | 12/1982 | Carter et al. | 252/174.16 |
| 4,369,317 | 1/1983 | Hawkins | 544/110 |
| 4,379,041 | 4/1983 | Petranek et al. | 204/415 |
| 4,437,994 | 3/1984 | Baker | 210/638 |
| 4,461,709 | 7/1984 | Batzer et al. | 210/643 |
| 4,500,494 | 2/1985 | Scher | 423/24 |
| 4,540,448 | 9/1985 | Gautier et al. | 148/6.15 |
| 4,555,343 | 11/1985 | Bauer et al. | 210/643 |
| 4,587,106 | 5/1986 | Bauer et al. | 423/8 |
| 4,793,942 | 12/1988 | Lokkesmoe et al. | 252/99 |

FOREIGN PATENT DOCUMENTS 1113712 1/1966 United Kingdom .

OTHER PUBLICATIONS

C. F. Vandergrift and E. P. Horwitz, *Journal of Inorganic Nuclear Chemistry*, 1977, vol. 30, pp. 1425–1432.

I. Komasawa, T. Otake and Y. Higaki, *Journal of Inorganic Nuclear Chemistry*, 1981, vol. 43, pp. 3351–3356.

M. S. White and Lakshminarayanaiah, *Currents in Modern Bilogy* 1969, pp. 39–44.

*The Journal of the American Oil Chemists Society*, vol. 40, pp. 642–645, Sep. 1963.

*Primary Examiner*—Prince E. Willis

*Attorney, Agent, or Firm*—Merchant, Gould, Smith, Edell, Welter & Schmidt

[57] ABSTRACT

An improved softening agent dispersed in an aqueous detergent comprising droplets having an exterior organic phase containing a complexing agent and an inner aqueous phase comprising an acid or salt. The ability of the softening agent to remove hardness ions is improved by a novel complexing agent.

33 Claims, 2 Drawing Sheets

I. MECHANISM

DETERSIVE SYSTEM WITH AN IMPROVED HARDNESS ION COMPLEXING AGENT

FIELD OF THE INVENTION

The invention relates to the use of a detersive system containing a soil removing detergent and a dispersed aqueous-organic softening agent that can remove hardness from service water during detergent action. The liquid softening agent of the invention can be used to remove hardness cations from an aqueous medium or use solution containing a detersive system either before or during detergent action. More particularly the hardness transfer and stability properties of the softening agent of the invention are improved by a complexing agent of enhanced properties. In addition, the improved complexing agent of the present invention is virtually water insoluble in high pH detersive systems, resulting in a much lower amount of complexing agent leaching from the organic phase into the bulk detersive phase than with the softening agents of the prior art.

BACKGROUND OF THE INVENTION

Detersive systems have been used for many years in many cleaning environments including laundry, warewashing, hard surface cleaning, and other applications. Typically, detersive systems are concentrates comprising mixtures of cleaning ingredients that when mixed with water form a cleaning medium or use composition. Service water, containing some concentration of hardness ions, supplied by local water utilities is most commonly used in making the use composition. Hardness ions are typically undesirable in conjunction with detersive systems since they interfere in the soil removal mechanism. The quality of service water varies from place to place throughout the country and can vary in the amount of hardness and can vary in the type of hardness components. Hardness typically comprises metal ions including calcium, magnesium, iron, manganese, and other typically divalent or trivalent metal cations, depending on the source of the water. The presence of hardness cations in service water can substantially reduce the detersive action or effectiveness of a detersive system, can result in the incomplete cleaning of laundry, dishware, hard surfaces, and other soiled items or surfaces and can leave films or scale comprising the hardness cation and/or components of the detersive system.

A great deal of attention in recent years has been given to the components of detersive systems that reduce the effects of the hardness components. Common hardness sequestering agents comprise inorganic chemicals such as a condensed phosphate compound and a zeolite, and organic sequestrants such as EDTA, organic phosphonates and organic phosphinates. Such agents are effective in treating hardness in service water by a chemical reaction which keeps the ions in the aqueous bulk detersive system but reduces the hardness effect of the ions on the detersive systems. These agents can be effective but can result in both economic and ecological disadvantages.

Recently, liquid membrane softening agents have been prepared for hardness treating or water softening. Such liquid agents can be used in detersive systems at low concentration and can effectively soften service water through a mechanism of removing hardness ions from aqueous media used in detersive systems with little adverse environmental impact, or compatibility problems in detersive systems. Such systems work through an organic phase, containing a complexing agent, dispersed in the bulk aqueous phase or aqueous detersive system. The organic phase contains an internal dispersed aqueous phase. Hardness ions in the bulk aqueous phase are transferred to the internal aqueous phase through the organic phase by the complexing agent. We believe that the driving force of the softening effect is caused by the chemical potential difference between the inner aqueous phase and the bulk aqueous solution. The phase stability and efficacy of the softening agent is, in part, in direct proportion to the characteristics of the complexing agent.

We have discovered a novel complexing agent that improves the stability and softening properties of the liquid membrane agent. The softening agent of the invention displays unexpectedly superior stability properties and hardness ion transfer properties. Prior art complexing agents tend to leach from the organic phase into the bulk aqueous phase during use thereby diminishing the effectiveness of the liquid membrane softening agents. The softening agent of the present invention is designed to be virtually water insoluble in high pH environments, resulting in no leaching of the complexing agent from the organic phase into the bulk detersive aqueous phase.

BRIEF DESCRIPTION OF THE INVENTION

We have found that a dispersion of an aqueous-organic hardness removing or water softening agent can be used in conjunction with detergent components in detersive systems. In an aqueous detersive system, the softening agent is a dispersion in the bulk aqueous phase of small liquid or solid organic droplets having an internal aqueous phase.

In somewhat greater detail, the softening agent comprises a dispersion of small droplets having an exterior organic complexing phase, an inner aqueous phase, containing soluble acid or an ionized salt, and a surfactant stabilizing the emulsion. The exterior organic phase comprises an organic medium which can be liquid or solid at room temperature and an organic soluble complexing agent that can bind hardness components.

The complexing agent of the invention comprises a molecule of the general formula:

wherein each R is independently a $C_{10-36}$ alkyl group, preferably a $C_{16-30}$ alkyl group, most preferably a $C_{20-30}$ alkyl group, or mixtures thereof. Most preferably R is a $C_{26}$ alkyl group for reasons of alkaline water insolubility and emulsion stability. The alkyl group R is preferably branched for reasons of emulsion stability.

Figure 1:
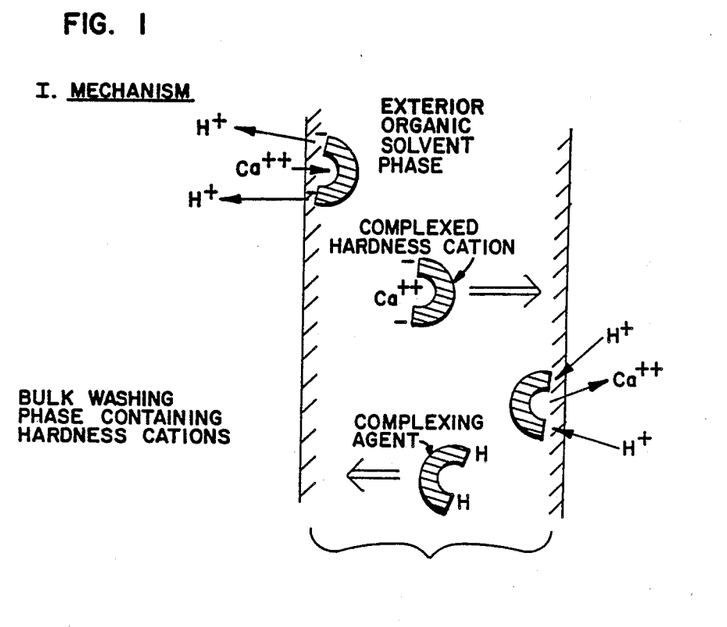
FIG. 1 is a depiction of the mechanism of hardness removal from a bulk aqueous washing phase.

The inner aqueous phase comprises a solution of strongly ionized species that acts as a sink or depository for hardness ions. Our current understanding of one possible mechanism of the action of the softening agent is as follows. At the interface between the organic phase and the bulk aqueous phase, the complexing agent first reacts with and extracts the hardness cations into the exterior organic phase, simultaneously releasing protons or salt cations into the bulk aqueous phase, depending upon whether the inner aqueous phase contains an acid or an ionized salt respectively. The hardness cation-complexing agent reaction product is then transferred to the interface between the inner aqueous phase and the exterior organic phase. There the hardness cations on the complexing agent are exchanged into the inner aqueous phase for protons if the inner aqueous phase contains an acid or for salt cations if the inner aqueous phase contains an ionized salt. The hardness cations remain in the inner aqueous phase. The protons or salt cations regenerate the complexing agent for a repeat of the cycle (see FIG. 1). In this way, calcium, magnesium, iron, manganese, and other divalent or trivalent hardness cations can be transferred against a concentration gradient if the complexing agent has an affinity for the hardness cation and a sufficient pH concentration or neutral salt gradient exists between the inner aqueous phase of the softening agent through the organic phase to the bulk aqueous detersive system phase. Protons or salt cations are thus transferred countercurrently to the hardness cations and provide a driving force to cause transfer of the hardness cations.

The inner aqueous phase is first emulsified in the exterior organic phase containing an organic soluble complexing agent with a surfactant to stabilize the emulsion. The softening agent is then dispersed in the bulk aqueous phase of the detergent composition. When the detergent composition is contacted with water to form a detersive system, the softening agent is then released into the use composition during the release of the detersive system. Alternatively the softening agent can be added to the aqueous wash medium or aqueous phase separately from the detergent composition. The softening agent thus functions in the use composition as a water-in-oil-in-water emulsion. The emulsion is designed to be stable or to stay intact to soften the aqueous medium at least for the duration of a wash cycle process or step. We have found that the complexing agents of this invention improve both softening performance and the stability of the softening agent.

One aspect of this invention relates to a softening agent containing the improved complexing agent and the inner aqueous phase. A second aspect of this invention relates to a detersive system containing the softening agent. A third aspect of this invention relates to a method of using a detersive system containing the softening agent, in an aqueous use medium for cleaning or soil removal purposes.

DETAILED DISCUSSION OF THE INVENTION

The detersive systems of our invention comprise a soil removing detergent and a dispersed softening agent having an inner aqueous phase stabilized by a surfactant within an exterior organic phase containing a complexing agent.

The complexing agent of the invention comprises a molecule of the formula:

wherein each R is independently a $C_{10-36}$ alkyl group, preferably a $C_{16-30}$ alkyl group, most preferably a $C_{20-30}$ alkyl group, or mixtures thereof. R is most preferably a branched $C_{26}$ alkyl group for reasons of alkaline water solubility and emulsion stability. The softening agents can be included in or used in conjunction with detersive systems formulated to clean dishware and flatware, laundry, clean-in-place equipment, hard surfaces, and other soiled articles or surfaces.

Softening Agent

The softening agent of the invention comprises two phases, an exterior organic phase and an inner aqueous phase, containing dissolved acid or strongly ionized salt, dispersed and contained within the exterior organic phase. The organic/aqueous phases of the softening agent are stabilized with a surfactant.

Surfactant

The softening agent can contain a surfactant that can stabilize the dispersion of the inner aqueous phase in the exterior organic phase. Typically, the surfactant is present in the softening agent and appears at the interface between the organic phase and the inner aqueous phase. After the softening agent is prepared, the surfactant can be also present in both the aqueous and the organic phases, although very little will be found in the aqueous phase. The stabilizing surfactant can be added to the organic phase during the preparation of the softening agent, and is typically mixed with the organic phase prior to the preparation of the softening agent. The inner aqueous phase of the softening agent serves as a sink or depository to contain the hardness cations which have been extracted from the bulk aqueous washing phase by the complexing agent. If substantial amounts of the inner aqueous phase of the softening agent are released into the bulk aqueous phase during cleaning, the extent of softening can be substantially reduced.

The surfactant can be used at a concentration of about 0.1 to about 50 wt-% based on the total weight of the organic phase. Preferably, the amount of surfactant used ranges from about 1 to 30 wt-% of the organic phase and most preferably, for reasons of economy and emulsion stability, about 1 to 20 wt-% of the stabilizing surfactant is used based on the total weight of the organic phase. The surfactant used is preferably oil soluble with a polymeric hydrophobic portion. Polysuccinimide derivatives and methods to make them are disclosed in U.S. Pat. Nos. 3,018,291 (Anderson et al); 3,172,892 (LeSuer et al); 3,219,666 (Norman et al); 3,024,237 (Drummond et al); 4,259,189 (Li) and 4,292,181 (Li et al) which are hereby incorporated by reference. The exterior organic solvent phase can comprise from about 25 to 95 vol-% of the softening agent. The inner aqueous phase can comprise from about 5 to 75 vol-% of the softening agent. Preferably the exterior organic solvent phase comprises from about 25 to 75 vol-% of the softening agent. Preferably the inner aqueous phase comprises from about 25 to 75 vol-% of the softening agent.

We have found that smaller droplet sizes yield greater rates of softening due to an increased surface area increasing the rate of extraction of hardness. We have also found that the use of smaller amounts of the softening agent is preferred since the softening agent contains an organic solid or a liquid solvent such as an oil. The softening agent can have a droplet size of from about 0.05 to 2000 microns, preferably from about 1.0 to 1000 microns, and most preferably to reduce the amount of organic and increase rate of softening the droplet size is about 1 to 500 microns.

Exterior Organic Phase

The exterior organic phase of the softening agent comprises a liquid, semi-solid or solid organic medium, at room temperature, and a effective amount of an organic soluble complexing or chelating agent. In the detersive systems of the invention, the softening agent can either be liquid or solid at room temperature. At use temperature the softening agent is preferably liquid or semi-liquid. Alternatively the softening agent can be a semi-solid or solid matrix, that can protect the softening agent from shear forces, with a separate liquid phase contained within the solid matrix which according to one possible mechanism of the invention allows the diffusion of the cation-complexing agent reaction product through the pores of the solid matrix. The improved complexing agent for hardness ion removal including the preferred bis(hexyldecyl) phosphoric acid, bis(eicosyl) phosphoric acid and bis(hexacosyl) phosphoric acid are typically made by a reaction between the aliphatic alcohol and phosphorous trichloride resulting in a dialkyl phosphite. The dialkyl phosphite is then reacted with a stoichiometric amount of gaseous chlorine. The reaction results in a dialkyl phosphochloridate. The dialkyl phosphochloridate can be hydrolyzed yielding the dialkyl phosphate. These reactions are set forth below:

For additional detail with respect to the manufacture of the dialkyl phosphate complexing agents of this invention, please see Cooper, *The Journal of the American Oil Chemists Society*, Vol. 40, pp. 642–645, September, 1963. The aliphatic alcohols are available from a number of sources including Exxon Corporation.

The exterior organic solvent phase can comprise about 0.1 to 99.9 wt-% of an organic medium and about 0.1 to 99 wt-% of a complexing agent. Preferably the organic medium phase comprises about 20 to 99 wt-% of an organic medium, and about 1 to 50 wt-% of a complexing agent or mixtures thereof.

Organic compositions useful in the exterior organic phase of the softening agent include essentially organic liquids, solids and semi-solids in which the hardness ion complexing agents are soluble. Useful liquid organics include compositions having a flash point preferably in excess of 200° F. Such liquids typically come in the form of a light, chemically inert oil of low volatility. Preferred organic phases comprise saturated paraffinic or naphthenic organic liquids and solids. Most importantly the organic phase should be relatively non-toxic, non-reactive with the inner aqueous phase, and have low solubility in the aqueous phase. Broadly, compounds that can be used as the organic phase include paraffinic hydrocarbons, naphthenic hydrocarbons, aromatic hydrocarbons, fatty acids and fatty alcohols that can be both liquid and solid at room temperature, including waxes, hydroxy waxes, fluorocarbon solvents, acid stable silicone oils and others. Most preferred organic solvents include light petroleum oils, paraffinic waxes, highly refined white oils and mixtures thereof.

In certain instances, a wax composition can be used as a solid component of the exterior organic phase or as an encapsulate in conjunction with a second, exterior organic phase component. Wax which is typically a saturated hydrocarbon compound solid at room temperature but melting prior to typical cleaning temperatures of bulk aqueous phase, can be used as the organic phase or in conjunction with a liquid organic phase where additional stability of the softening agent is required. In granular systems, the softening agent can be prepared in a wax form stabilizing the emulsion within the wax particle. In liquid or solid detersive systems, the wax at room temperature can remain in solid form and can protect the organic components of the softening agent from any adverse interaction with the cleaning components of the detersive systems.

Historically waxes are known to include substances that are natural and synthetic products. Chemically naturally occurring waxes are esters of fatty acids and monohydric fatty alcohols, relatively high molecular weight monohydric fatty alcohols, and other components. Modern synthetic waxes typically include saturated hydrocarbons having aliphatic or open chain structures with relatively low branching or side chains. Physically waxes are water repellant solids at room temperature having a useful degree of plastic character. Particularly preferable waxes for use in the softening agent compositions of the invention are petroleum waxes, beeswax, microcrystalline wax, slack wax, and paraffin wax. Particularly useful waxes are solids at room temperature but have softening points or melting points at the temperature of use of the detersive system, commonly above about 100° F., preferably 120°. The softening agents of the invention typically have highest efficiency when the wax is melted, resulting in a liquid phase for the efficient transfer of hardness components of service water into the interior inner aqueous phase.

A room temperature solid wax can be used in conjunction with a second organic composition in different modes including: (1) with a wax that can melt at use temperature, (2) with an organic solid or semi-solid matrix, and (3) with two waxes, a first wax having a melting point below the temperature of use solution and a second wax having a melting point above the use solution.

In detersive systems having greater than 500 ppm or greater the 200 ppm aqueous cleaning surfactant or organic detergent the use of wax as the organic phase or as an organic phase encapsulate is preferred.

Inner Aqueous Phase

An inner aqueous phase is contained within the exterior organic phase of the softening agent. The aqueous phase can contain acid or strongly ionized salt. We believe that the difference in chemical potential (pH, concentration gradient, etc.) drives the softening effect.

A. Acids

The inner aqueous phase can comprise from about 1 to 99.5 wt-% water and from about 0.5 to 99 wt-% acid. The excess protons in the inner aqueous phase over the bulk aqueous phase provides the driving force for the softening effect. Depending on end use and hardness of service water the inner aqueous phase can comprise concentrated acid or from about 10 to 99.5 wt-% water and from about 0.5 to 90 wt-% acid. Both organic and inorganic acids can be used. Examples of acid which can be used in the inner aqueous phase include but are not limited to the following: hydrochloric acid, nitric acid, sulfuric acid, sulfamic acid, phosphoric acid; a carboxylic acid such as citric acid, acetic acid, chromic acid, trihaloacetic acid, acrylic acid, polyacrylic acid polymers, or mixtures thereof.

B. Salts

The inner aqueous phase can comprise from about 1 to 99.5 wt-% water and from about 0.5 to 99 wt-% of a strongly ionized soluble salt. We believe that the excess concentration of salt in the inner aqueous phase over the bulk aqueous phase provides the driving force for the softening effect. Depending on the end use and hardness of service water, the inner aqueous phase can comprise a concentrated solution of salt or from about 10 to 90 wt-% water and from about 10 to 90 wt-% ionized species. Both organic and inorganic anions and cations can be used. Examples of salts which can be used in the inner aqueous phase include but are not limited to salts of the following acids: hydrochloric, nitric, sulfuric, sulfamic, phosphoric, and carboxylic acids such as citric acid, acetic acid, chromic acid, trihaloacetic acid, acrylic acid, polyacrylic acid polymers or mixtures thereof. The above acids can be neutralized into the form of soluble salts by reaction with bases typically including sodium hydroxide, potassium hydroxide, lithium hydroxide, cesium hydroxide, rubidium hydroxide, sodium bicarbonate, potassium bicarbonate, ammonium hydroxide, monosodium phosphate, monopotassium phosphate, disodium phosphate, dipotassium phosphate, and other alkaline salts.

Detersive Systems

The liquid softening agents of this invention can be included in or used in conjunction with a detersive system. Detersive systems are concentrates that comprise a combination of ingredients that can be used primarily in dilute form in aqueous media and can act to remove soil from a substrate. The detersive systems of this invention are typically in the form of a liquid, particulate, or solid. Liquids include flowable compositions including solutions, both dilute and concentrated, suspensions, gels and slurries. Particulates include products made by particle mixing, dry blending and granulation. Solids include cast solids, extrudates, pellets, or compressed solids.

A detersive system typically contains a detergent which is a chemical compound that can weaken or break bonds between soil and a substrate. Organic and inorganic detergents include surfactants, solvents, alkalis, basic salts and other compounds. A detersive system is typically used in a liquid cleaning stream, spray, bath, etc. which produces an enhanced cleaning effect that is caused primarily by the presence in the bath of a special solute (the detergent) that acts by altering the interfacial effects at the various phase boundaries (i.e. between soil, substrate and both) within the system. The action of the bath typically involves more than simply soil dissolution. The cleaning or washing process in a typical detersive system usually consists of the following sequence of operations. The soiled substrate is immersed or otherwise introduced into or contacted by a large excess of a bath containing a detergent solute. The soil and the underlying object or substrate typically becomes thoroughly wetted by the bath. The system is subjected to mechanical agitation by rubbing, shaking, spraying, mixing, pumping or other action to provide a shearing action which aids in the separation of the soil from the substrate. The bath now containing the soil is typically removed from the object to be cleaned, the object is rinsed and often dried.

Detersive systems are often used in cleaning hard surfaces such as sinks, tiles, windows, and other glass, ceramic, plastic or other hard surface dishware, and laundry or other textiles. Soils removed from substrates by the detersive systems are extremely variable in composition. They may be liquid, solid or a mixture thereof. The soils typically consist of mixtures of proteinaceous, carbohydrate, and fatty materials typically in combination with inorganic components and some water.

Detersive baths typically contain a detergent which is often an organic surfactant detersive component, an inorganic detersive component, or combinations of organic and inorganic components, and can typically be used in combination with other organic and inorganic components that provide additional properties or enhance the basic detersive property of the detersive component. The compositions dissolved or suspended in water to provide detersive systems are formulated to suit the requirements of the soiled substrate to be cleaned and the expected range of washing conditions. Few cleaning systems have a single component. Formulated detersive systems consisting of several components often out-perform single component systems. Materials which can be used independently in detersive systems are as follows:

(a) surfactants including various synthetic surfactants and natural soaps;
(b) inorganic builders, diluents, or fillers including salts, acids and bases;
(c) organic builder additives which enhance detergency, foaming power, emulsifying power, soil suspension;
(d) special purpose additives such as bleaching agents, brightening agents, enzymes, bactericides, anticorrosion agents, emollients, dyes, fragrances, etc.; and
(e) hydrotrope solubilizers used to insure a compatible uniform mixture of components including alcoholic cosolvents, low molecular weight anionic surfactants, emulsifying agents, etc. When blending the detersive components and the softening agent, enhanced compatibility and stability can be achieved if the specific gravity of the liquid detersive system matches the specific gravity of the softening agent.

Organic Surfactant

The detersive systems of this invention can include an organic surfactant in combination with or in conjunction with the aqueous/organic softening agent. A surfactant should be selected which is compatible with the oil-in-water emulsion. Surfactants which are very good oil emulsifiers or stabilizers will tend to strip away the organic phase of the softening agent, thus destroying the water in oil emulsion.

Preferred surfactants are the nonionic, anionic, and cationic surfactants. Cationic surfactants such as quaternary ammonium compounds are frequently used in detersive systems but are typically not cleansing ingredients and are used for purposes such as sanitizing or fabric softening.

Surfactants useful with the softening agents of this invention in the detersive systems comprise soaps, i.e. (a) sodium or potassium salts of fatty acids, rosin acids, and tall oil; (b) alkylarene sulfonates such as propylene tetramerbenzene sulfonate; (c) alkyl sulfates or sulfonates including both branched and straight chain hydrophobes as well as primary and secondary sulfate groups; (d) sulfates and sulfonates containing an intermediate linkage between the hydrophobic and hydrophilic groups such as taurides and sulfonated fatty mono glycerides, long chain acid esters of polyethylene glycol, particularly a tall oil ester; (f) polyalkylene glycol ethers of alkyl phenols wherein the alkylene group is derived from ethylene or propylene oxide or mixtures thereof; (g) polyalkylene glycol ethers of long chain alcohols or mercaptans, fatty acyl diethanolamides; (h) block copolymers of ethylene oxide and propylene oxide; and others.

Anionic surfactants such as alkyl or aryl sulfonates or sulfates and amphoterics such as amine oxides are preferred for reasons of emulsion stability. Since these surfactants are typically medium to high foaming surfactants, some type of antifoam or foam breaker may be used for non-foaming detersive systems.

Inorganic Compounds

Detersive systems can contain inorganic detergent compounds which are typically grouped into the following six categories: alkalis, phosphates, silicates, neutral soluble salts, acids, and insoluble inorganic builders.

Sources of alkalinity useful in combination with or in conjunction with the liquid softening agents of the invention include but are not limited to the following: alkali metal hydroxides, alkali metal carbonates, alkali metal bicarbonates, alkali metal sesquicarbonate, alkali metal borates, and alkali metal silicate. The carbonate and borate forms are typically used in place of alkali metal hydroxide when a lower pH is desired. Silicates ($Na_2O:SiO_2$ compounds) which are typically a reaction product between sodium hydroxide and silica, have a variety of $Na_2O:SiO_2$ reaction molar ratios. Silicates are primarily used as alkalis and as builders in both warewashing and laundry formulations. We have found that the addition of base can aid in dispersing the softening agent in detersive systems.

Builders

Threshold agents can be useful in conjunction with or in combination with the softening agents of the invention include organic and inorganic carboxylates, phosphates, phosphonates and mixtures thereof. Such agents include but are not limited to the following: organic acrylate polymers, phosphinic and phosphonic acids, inorganic phosphate compositions including monomeric phosphate compounds such as sodium orthophosphate and the higher condensed phosphates including tetraalkali metal pyrophosphates, sodium tripolyphosphate, glassy phosphates and others. Threshold agents are typically used at low concentration, about 0 to 50 ppm, in order to slow or delay the formation of deposits of hardness components through a much less than stoichiometric reaction between the threshold agent and the inorganic components of hardness in service water. Phosphates are typically used as sequestering, suspending and cleaning agents. Sodium tripolyphosphate is the most widely used builder in heavy duty detergents.

Neutral soluble salts (which are typically the reaction product of a strong acid and a strong base including sodium sulfate, sodium chloride, and others) can be used in conjunction with or in combination with the detersive systems of the invention. Neutral soluble salts are typically used as builders or diluents in synthetic surfactant based detersive compositions.

Insoluble bulking agents are often used in liquid, gel and solid detersive systems. The insoluble inorganics including clays, both natural and synthetic, such as montmorilonite clay or bentonite clay, can have a detersive effect in certain systems. Further, they can be used as suspending agents to maintain or stabilize a liquid or gelled system.

Organic Builders and Additives

Further, the detersive systems can contain organic builders and other special purpose additives. This class of compound is typically organic molecules having little detersive nature but containing many other desirable properties including antiredeposition additives, sequestrants, antifoaming or foaming additives, whiteners and brighteners, additives or hydrotropes for maintaining the solubility of components, and additives for protecting both the substrate and the washing apparatus. The most common organic additives include organic sequestrants and organic antiredeposition agents. Organic sequestrants include compositions such as polyacrylic acid and methacrylic acid polymers, ethylene diamine tetraacetic acid, nitrilo- triacetic acid, etc. and others.

Sources of Active Chlorine

Sources of active chlorine useful in conjunction with or in combination with the liquid softening agent of the invention include but are not limited to the following: alkali metal and alkaline earth metal hypochlorite, chlorinated condensed phosphates, dichloroisocyanurate, chlorinated cyanurate, and mixtures thereof. Specific examples of active chlorine sources include the following: sodium hypochlorite, calcium hypochlorite, chlorinated sodium tripolyphosphate and mixtures thereof.

Common detersive systems in use today are laundry systems, industrial, institutional and household dishwashing or warewashing compositions, clean-in-place and hard surface cleaning compositions. The softening agents of the invention can be used in all of these detersive systems.

In aqueous dishwashing, detersive solutions are prepared from typically liquid, particulate or solid detersive systems by the action of water within a warewashing machine. The softening agent of this invention can be used in detersive compositions prepared from solid, particulate or liquid warewashing cleaners.

Dishwashing detersive systems typically comprise a source of alkali in the form of an alkali metal hydroxide, alkali metal carbonate, or alkali metal silicate in combination with a hardness sequestering agent, optional surfactants, a source of active halogen, and other optional chemical substances. The softening agents of this invention can effectively be used in warewashing detersive systems.

An aqueous surfactant and the softening agent of this invention can be used in a clean-in-place-cleaning environment in which the chemical properties of the aqueous surfactant and liquid softening agent solution pumped into and through a site requiring cleaning are relied on to the exclusion of mechanical soil removing processes in order to clean pipelines, process equipment, storage tanks, and other enclosed easily soiled locations. Such applications require significant detergency and stability to chemical soils.

The softening agents of the present invention can be used in laundry detersive systems. Laundry detersive systems typically in the form of liquid, particulate or solid compositions can be used in both household and institutional laundry equipment to clean and destain typically soiled fabric articles. Cleaning of such articles is typically accomplished by removing soil that is physically associated with the fabric and by destaining or bleaching soils that cannot be removed by typical detersive systems. Laundry compositions typically comprise anionic or nonionic surfactants, water, softening or hardness sequestering agents, foam stabilizers, pH buffers, soil suspending agents, perfumes, brighteners, opacifiers, and colorants. If the laundry detersive system is in liquid form typically the components are dissolved or suspended in water, while if in a gelled form the water solution is typically combined with a gelling agent.

Further, the softening agents of this invention can be used in a variety of liquid detergent compositions that can be used in a variety of environments including hard surface cleaning, hand cleaning, general household cleaning, car washing, recreational equipment cleaning, etc. Such detersive systems are used in the form as shown below or in aqueous solution prepared from the compositions as shown below.

TABLE A

Liquid Hard Surface Cleaner
Surfactant - Softening Agent Composition

| Preferred Component | Useful Wt % | Preferred Wt % | Most Preferred Wt % |
|---|---|---|---|
| Surfactant | 0.1–95 | 0.5–20 | 0.5–10 |
| Softening agent | 0.1–40 | 1–30 | 10–30 |
| Water | Balance | Balance | Balance |
| Thickener | 0.5–50 | 0.5–20 | 0.5–10 |

TABLE B

Warewashing Cast (or C-I-P) Composition

| Preferred Component | Useful Wt % | Preferred Wt % | Most Preferred Wt % |
|---|---|---|---|
| Source of alkalinity | 5–70 | 10–60 | 20–50 |
| Chlorine source | 0.1–15 | 1–10 | 1–5 |
| Softening agent | 1–60 | 2–50 | 3–40 |
| Water | Balance | Balance | Balance |

TABLE C

Laundry Granular Composition

| Preferred Component | Useful Wt % | Preferred Wt % | Most Preferred Wt % |
|---|---|---|---|
| Surfactant | 0.1–50 | 1–40 | 1–25 |
| Source of alkalinity | 0.1–95 | 1–40 | 10–40 |
| Semi-solid wax based softening agent | 1–60 | 2–50 | 1–40 |

TABLE D

Detersive Composition

| Preferred Component | Useful Wt % | Preferred Wt % | Most Preferred Wt % |
|---|---|---|---|
| Source of Alkalinity | 0.1–60 | 0.5–50 | 1–40 |
| Surfactant | 0.5–10 | 1–5 | 1–4 |
| Chlorine source | 0.5–10 | 1–5 | 1–4 |
| Softening agent | 1–60 | 2–50 | 3–40 |

TABLE E

Liquid Softening Agent

| Preferred Component | Useful | Preferred | Most Preferred |
|---|---|---|---|
| | Vol % | Vol % | Vol % |
| EXTERIOR ORGANIC PHASE | 95–25 | 75–25 | 60–25 |
| INNER AQUEOUS PHASE | 5–75 | 25–75 | 40–75 |
| EXTERIOR PHASE Components: | Wt % | Wt % | Wt % |
| Organic solvent | 0.1–99.9 | 20–99 | 25–90 |
| Complexing agent | 0.1–99.9 | 1–50 | 1–40 |
| Surfactant | 0.1–50 | 1–30 | 1–20 |
| INNER AQUEOUS PHASE Components: | | | |
| Acid or Salt | 0.5–99 | 0.5–80 | 10–70 |
| Water | Balance | Balance | Balance |

One method to prepare a cast solid detergent is as follows: Alkali metal salts, preferably in the form of sodium carbonate, sodium hydroxide beads, or sodium silicate are stirred into an aqueous sodium hydroxide solution. The composition is heated to a temperature of 200° F. until the composition becomes uniform. The mixture is then cooled to 145° F. Then, the softening agent is slowly added to the bottom of the mix tank. The mixture is stirred until uniform, maintaining the temperature of the mixture between 145°–160° F. The mixture is then cooled to 140°–142° F., and is poured into a mold where the mixture hardens to a cast solid detergent block. The softening agent is thus trapped in the solid caustic matrix as small, dispersed droplets.

The detergent block may be dispensed into a washing machine by a water spray which erodes or dissolves the block. A conductivity probe monitors the concentration of the detergent in the wash solution.

To prepare a liquid detergent composition, a thickener is added to a liquid detergent base containing a source of alkalinity, usually sodium hydroxide, and a surfactant dissolved in the water. The softening agent is then added to the thickened liquid base with agitation to disperse the softening agent evenly in the slurry. The slurry would then be pumped or in some way metered out into the washing process.

The softening agents used in this invention are water-in-oil emulsions, and therefore, any liquid detergent employing them must be a water-in-oil-in-water emulsion. The main stabilizing agent used to make these double emulsions is a viscosity builder, or thickener, which prevents coalescence of the dispersed liquid emulsion droplets. Thickeners which can be utilized include such compounds as Laponite ® RDS, which is a trademark of Laporte Industries Ltd., a clay; Natrosol ®, which is a trademark of Hercules, Inc., a hydroxyethyl cellulose; and polyacrylates, preferably having molecular weights close to 4,000.

Small droplets of the softening agent should be utilized in the liquid detergent composition so that the softening agent will not be excessively sheared during the preparation of the detergent composition. If the softening agent is subjected to high shear during preparation, it will tend to break the emulsion and reduce its effectiveness.

To prepare particulate detergent compositions, the softening agent must be made in a solid form. The selection of an oil phase of the softening agent in the form of a wax with a melting point above room temperature is an acceptable choice. Other solid phases can be used if solid at room temperature and if melted at the washing process temperature (i.e. 120°–180° F.). The emulsion can be processed to form solid particles of the emulsion in which the acid aqueous phase is held within the solidified exterior phase. The particulates may be formed by spraying a stream of the molten material into a fluid such as air or water such that the fluid is significantly below the solidification temperature of the exterior phase. The particulates may be on the order of 25–1000 microns in diameter.

The following Examples further illustrate the invention and provide a best mode.

EXAMPLE I

Synthesis of Bis(tridecyl) Phosphate

Into a three neck, 2 liter round bottom flask equipped with a nitrogen blanket, ice bath, magnetic stirrer, thermometer, HCl trap, aspirator, chlorine source, and vacuum pump was placed 598.5 grams (2.98 moles) tridecyl alcohol. Into the dropping funnel was placed 136.76 grams (0.9957 moles) phosphorous trichloride. The $PCl_3$ was added to the tridecyl alcohol at a temperature maintained between 23° and 35° C. over a 35 minute period. The reaction was continued for an additional 5 hours, resulting in a cloudy oil.

The crude reaction product was distilled at 0.9 millimeters mercury, 113°–115° C. pot temperature, 84°–92° vapor temperature. The distillation yielded 88.4% of theoretical yield of bis(tridecyl) phosphite, wherein $R=C_{13}$ and the total number of carbon atoms in the complexing agent is 26.

The bis(tridecyl) phosphite product formed above was placed in a 2 liter single neck round bottom flask equipped with a source of chlorine, thermometer, placed in a salt ice bath on a stirring plate. An excess amount of chlorine was added to the bis(tridecyl) phosphite product in the cooled bath until more than a stoichiometric amount was absorbed. The material was stripped of chlorine and hydrochloric acid and 1.2 liters of deionized water was added to the round bottom flask which was then heated to reflux for 6 hours. The crude reaction product was placed in a 2 liter separatory funnel and a water layer was removed. The organic layer was stripped of residual water in a rotary evaporator, yielding 453.9 grams of product. 31-P and 13-C NMR indicate that the product is 97% dialkyl phosphate at 3% monoalkyl phosphate. It is important that the concentration of dialkyl phosphate be high in order to avoid stability problems.

EXAMPLE II

Example I was repeated except that a $C_{20}$ branched chain alcohol was substituted for the $C_{13}$ alcohol of Example I, resulting in the synthesis of bis(didecyl) phosphate wherein R is a $C_{20}$ alkyl group and the complexing agent thus contains 40 carbon atoms.

EXAMPLE III

Example I was repeated except that a $C_{16}$ branched chain alcohol was used in place of the $C_{13}$ alcohol of Example I, resulting in the synthesis of bis(hexadecyl) phosphate wherein in R is a $C_{16}$ alkyl group and the complexing agent thus contains a total of 32 carbon atoms.

EXAMPLE IV

Example I was repeated except that a $C_{10}$ branched chain alcohol was used in place of the $C_{13}$ alcohol of Example I, resulting in the synthesis of bis(decyl) phosphate wherein R is a $C_{10}$ alkyl group and the complexing agent contains a total of 20 carbon atoms.

EXAMPLE V

A liquid softening agent was prepared having the following composition:

50.0 Vol.-% Organic Solvent Phase:

3.87 wt-%, bis(2-ethyl hexyl) phosphoric acid, 98% (DEHPA) (wherein R=8 and the total number of carbon atoms is 16) (0.1 M in oil) (available from K&K Rare and Fine Chemicals)

4.0 wt-% polyethyleneimine derivative of polyalkenyl substituted succinimide, Paranox 105, Exxon Corporation surfactant 92.13 wt-% light mineral oil (KLEAROL ® mineral oil, Witco Chemical Corporation)

50.0 Vol.-% Inner Aqueous Acidic Phase:

12 N $H_2SO_4$ in deionized water

The liquid softening agent was prepared by first dissolving the complexing agent in the mineral oil and then adding the polyimine surfactant. The organic solvent phase was agitated until the components were fully dispersed. The 12 N $H_2SO_4$ was then added to the organic phase and the emulsion was formed using an ultrasonic emulsifier.

An aqueous water phase having a synthetic hardness of 85.1 ppm calcium was added to a 1 liter glass beaker equipped with a stirrer. Into the aqueous phase was placed 2000 parts per million (1.76 grams) of the liquid softening agent prepared above. The temperature of the aqueous solution was 160° F., and the solution was agitated at 300 rpm. The pH was kept near 7.6 using tris(hydroxymethyl) aminomethane, i.e., "Tris buffer". The amount of calcium removed from the bulk solution by the softening agent was measured at various intervals by withdrawing a 10 ml sample, filtering out the softening agent, and titrating the solution with EDTA (ethylenediaminetetraacetic acid) for calcium concentration determination.

The following Table F shows that approximately 0% of the calcium was extracted from the bulk aqueous phase into the inner aqueous phase of the softening agent after 20 minutes. The Table demonstrates that at very low levels of softening agent loading under the above described conditions, the shorter chain $C_{16}$ complexing agent DEHPA is not able to transfer hardness ions to any appreciable extent.

In U.S. application Ser. No. 07/001,397 it was demonstrated that significant transfer of hardness ions could be obtained by using a complexing agent concentration in oil which was five times greater than the complexing agent concentration utilized in this experiment. The complexing agents utilized in Ser. No. 07/001,397 were DEHPA and CYANEX ® 272 (American Cyanamid Company) both of which contain a total of only 16 carbon atoms. This experiment demonstrates that if one desires to use a much lower concentration of complexing agent in oil phase one cannot effectively utilize a short chain complexing agent such as DEHPA. This is most probably due to leaching of the complexing agent into the bulk aqueous phase.

TABLE F

| | Softening Agent Performance | | | |
|---|---|---|---|---|
| Time (Minutes) | $Ca^{++}$ (ppm) | $Ca^{++}$ Total Grains | % of $Ca^{++}$ Extracted | pH |
| 0.0 | 85.06 | 12.5 | 0.0 | 7.6 |
| 2.0 | 82.07 | 12.1 | 3.5 | 7.6 |
| 5.0 | 82.07 | 12.1 | 3.5 | 7.6 |
| 10.0 | 83.57 | 12.3 | 1.8 | 7.6 |
| 20.0 | 85.06 | 12.5 | 0.0 | 7.6 |

EXAMPLE VI

A liquid softening agent was prepared having the following composition according to the method of Example V.

50.0 Vol.-% Organic Solvent Phase:

0.1 moles bis(decyl) phosphate per liter of oil phase (complexing agent of Example IV) (wherein R=10 and the total number of carbon atoms is 20.)

4.00 wt-% polyethyleneimine derivative of polyalkenyl substituted succinimide, Paranox 105, Exxon Corporation surfactant Balance light mineral oil (KLEAROL ® mineral oil, Witco Chemical Corporation)

50 Vol.-% Inner Aqueous Acidic Phase 12.0 N $H_2SO_4$ in deionized water

Hard water containing 92.52 parts per million total hardness (as calcium) was combined with 2000 ppm of the softening agent prepared above. The water temperature was about 160° F. The pH was kept at approximately 7.6 using a Tris buffer. The amount of calcium and magnesium ions removed from the bulk solution by the softening agent was measured at various intervals by the method of Example V. The following table shows that approximately 42% of the hardness was extracted from the bulk aqueous phase into the inner aqueous phase of the softening agent after 2 minutes, while only 16.1% total hardness was still extracted after 20 minutes. The softening agent initially did quite well in extracting hardness, but the emulsion of the softening agent appeared to break down, and some of the hardness was released back into the water. This data indicates a deficiency with respect to softening agent emulsion stability upon use of the $C_{20}$ complexing agent.

TABLE G

| | Softening Agent Performance | | | |
|---|---|---|---|---|
| Time (Minutes) | Total Hardness (as $Ca^{++}$) (ppm) | Grains/ Gallon (as $CaCO_3$) | % of Original Hardness Extracted | pH |
| 0.0 | 92.52 | 13.6 | 0.0 | 7.65 |
| 2.0 | 53.72 | 7.9 | 41.9 | 7.49 |
| 5. | 58.20 | 8.6 | 37.1 | 7.47 |
| 10.0 | 74.61 | 11.0 | 19.4 | 7.45 |
| 20.0 | 77.60 | 11.4 | 16.1 | 7.41 |

EXAMPLE VII

50 Vol.-% Organic Solvent Phase

A liquid softening agent was prepared having the following composition according to the method of Example V.

0.1 moles bis(hexadecyl) phosphate per liter of oil phase. (Complexing Agent of Example III wherein R=16 and the total number of carbon atoms in the complexing agent is 32.)

2.0 wt-% polyethyleneimine derivative of polyalkenyl substituted succinimide, Paranox 105, Exxon Corporation surfactant Balance light mineral oil (KLEAROL ® mineral oil, Witco Chemical Corporation)

50 Vol.-% Inner Aqueous Acidic Phase:

12 N $H_2SO_4$ in deionized water

Hard water containing 88.04 parts per million hardness (as calcium) was combined with 2000 ppm of the softening agent prepared above. The water temperature was about 160° F. The pH was kept relatively constant using a Tris buffer. The following table shows that approximately 34% of the hardness was extracted from the bulk aqueous phase into the inner aqueous phase of the softening agent after 20 minutes, demonstrating that the longer chain $C_{32}$ complexing provided a much better transfer of hardness ions than the $C_{16}$ or $C_{20}$ complexing agents and produced a more stable emulsion.

TABLE H

| | Softening Agent Performance | | | |
|---|---|---|---|---|
| Time (Minutes) | Total Hardness (as $Ca^{++}$) (ppm) | Grains/ Gallon (as $CaCO_3$) | % of Original Hardness Extracted | pH |
| 0 | 88.04 | 13.0 | 0.0 | 7.73 |
| 2 | 71.63 | 10.5 | 18.6 | 7.63 |
| 5 | 68.64 | 10.1 | 22.0 | 7.60 |
| 10 | 65.66 | 9.7 | 25.4 | 7.58 |
| 20 | 58.20 | 8.6 | 33.9 | 7.51 |

EXAMPLE VIII

A liquid softening agent was prepared having the following composition:

50 Vol.-% Organic Solvent Phase:

0.1 moles bis(tridecyl) phosphoric acid per liter oil phase (complexing agent prepared in Example I) wherein R=13 and the total number of carbon atoms in the complexing agent is 26.

4 wt-% polyethyleneimine derivative of polyalkenyl substituted succinimide. Paranox 105, Exxon Corporation surfactant)

Balance light mineral oil (KLEAROL ® mineral oil, Witco Chemical Corporation.

50 Vol.-% Inner Aqueous Acidic Phase:

12 N $H_2SO_4$ in deionized water.

The liquid softening agent was prepared by the method described in Example V.

An aqueous soft water phase having a total hardness of 88.6 ppm (as calcium) and buffered at a pH of 7.6–7.8 using a Tris buffer was added to a 1 liter glass beaker equipped with a stirrer. Into the aqueous phase was placed 2,000 parts per million (1.76 grams) of the liquid softening agent prepared above. The temperature of the aqueous solution was 160° F. and the solution was agitated at 300 rpm. The amount of total hardness removed from the bulk solution by the softening agent was measured at various intervals. Table I below shows a substantial removal of hardness ions by the 10 minute mark, but an increase in hardness concentration between 10 and 20 minutes. This indicates that the emulsion is breaking up and releasing hardness ions back into the water. These results are typical of experiments using the $C_{26}$ complexing agent.

TABLE I

| | Softening Agent Performance | | | |
|---|---|---|---|---|
| Time (Minutes) | Total Hardness (as $Ca^{++}$) (ppm) | Grains/ Gallon (as $CaCO_3$) | % of Original Hardness Extracted | pH |
| 0 | 88.6 | 13.0 | 0.0 | 7.80 |
| 2 | 59.5 | 8.8 | 32.8 | 7.80 |
| 5 | 50.8 | 7.5 | 42.6 | 7.76 |
| 10 | 43.6 | 6.4 | 50.8 | 7.70 |
| 20 | 58.6 | 8.5 | 34.4 | 7.65 |

EXAMPLE IX

A liquid softening agent was prepared as above having the following composition: 50 vol.-% organic solvent phase, 5.18 grams light mineral oil (KLEAROL ® mineral oil, Witco Chemical Corporation), 0.53 grams of the complexing agent of Example II wherein $R=C_{20}$ and the total number of carbon atoms in the complexing agent is 40, 0.24 grams of a polyethyleneimine derivative of polyalkenyl substituted succinimide PARANOX 105, Exxon Corporation, surfactant), 50 vol.-% inner aqueous acidic phase, 12 N sulfuric acid in deionized water.

The liquid softening agent was prepared according to the description of Example V.

Hard water containing 92.9 parts per million hardness (as calcium) was combined with 2,000 ppm of the softening agent prepared above. The system was again buffered using Tris buffer at a pH of approximately 7.8. The following table shows that approximately half of the hardness was extracted from the bulk aqueous phase into the inner aqueous phase of the softening agent. Furthermore, the hardness level did not again increase after 10 minutes as it did in the previous example. These results, which again are typical for bis($C_{20}$) complexing agents indicate that the softening agent emulsion stability is increased by lengthening the two carbon chains attached to the phosphorous atom from 13 to 20 carbon atoms.

TABLE J

| | Softening Agent Performance | | | |
|---|---|---|---|---|
| Time (Minutes) | Total Hardness (as $Ca^{++}$) (ppm) | Grains/ Gallon (as $CaCO_3$) | % of Original Hardness Extracted | pH |
| 0 | 92.9 | 13.7 | 0.0 | |
| 2 | 65.32 | 9.6 | 29.7 | |
| 5 | 59.51 | 8.8 | 35.9 | |
| 10 | 49.35 | 7.3 | 46.9 | |
| 20 | 49.35 | 7.3 | 46.9 | |

EXAMPLE X

Example X followed the same procedure utilized in Example IX except that 1000 ppm NaOH was used to buffer the bulk water. 50 ppm of a polyacrylic acid, MW of 4000, 50 ppm of Acrysol LMN-45N, and 5 ppm of Dequest 2010 were added to the water to prevent the initial precipitation of hardness until the softening agent began transferring. Acrysol LMW-45N is a neutralized polyacrylic acid available from Rohm & Haas. Dequest 2010 is 1-hydroxethylidene-1,1-diphosphonic acid available from Monsanto. This experiment gave identical results to Example IX which used Tris buffer. This example demonstrates that it makes no difference whether Tris buffer or NaOH is used as the pH buffering agent. Further, this example demonstrates that the effectiveness of the softening agent is unaffected by alkalinity. Examples IX and X both transferred 46-47% of the hardness from the bulk water in 20 minutes and showed no signs of membrane instability over that time period.

TABLE K

| | Softening Agent Performance | | | |
|---|---|---|---|---|
| Time (Minutes) | Total Hardness (as $Ca^{++}$) (ppm) | Grains/ Gallon (as $CaCO_3$) | % of Original Hardness Extracted | pH |
| 0 | 92.90 | 13.7 | 0.0 | |
| 2 | 62.42 | 9.2 | 32.8 | |
| 5 | 55.16 | 8.1 | 40.6 | |
| 10 | 50.08 | 7.4 | 46.1 | |
| 20 | 49.35 | 7.3 | 46.4 | |

EXAMPLE XI

A liquid softening agent was prepared having the following composition according to the method of Example V.

50 wt-% organic solvent phase:

3.02 g bis(hexacosyl) phosphoric acid wherein $R=26$ and the total number of carbon atoms is 52. (synthesized according to the method used in Example I using a $C_{26}$ branched chain alcohol EXXAL 26 from Exxon Chemical Corporation.)

0.24 g Paranox 105 (2 wt-%); Exxon Corporation surfactant.

24.9 g light mineral oil (KLEAROL, ® Witco Chemical Corporation);

50 wt-% inner aqueous acidic phase:

12 N $H_2SO_4$ in deionized water.

The liquid softening agent was prepared by first dissolving the bis(hexacosyl) phosphoric acid complexing agent and a polyethyleneimine derivative of polyalkenyl substituted succinimide in the mineral oil. The organic softening phase was agitated until the components were fully dispersed. The 12 N $H_2SO_4$ was then added to the organic phase under very high shear and emulsified using an ultrasonic emulsifier.

Hard water with a hardness of 90.0 ppm (as calcium) and 1000 ppm NaOH was combined with 2,000 ppm softening agent. 50 ppm of a polyacrylic acid, MW of 4000, 50 ppm Acrysol LMN-45H, and 5 ppm of Dequest 2010 were added to the water to prevent the initial precipitation of hardness until the softening agent began transferring. The pH was approximately 11-12. Into the bulk aqueous phase was placed sufficient softening agent to create 2000 ppm concentration. The water temperature was 160° F. The amount of hardness ions removed from the bulk solution by the softening agent was measured at various time intervals. As shown in the following Table, 50.0% of the hardness ions were removed within 30 minutes. Again, as in Example IX, the hardness level did not rise again during the even longer 30 minute time period, indicating that a more stable emulsion was formed with the $C_{52}$ complexing agent.

TABLE K

| | Softening Performance | | | |
|---|---|---|---|---|
| Time (Minutes) | Total Hardness (as $Ca^{++}$) (ppm) | Grains/ Gallon (as $CaCO_3$) | % of Original Hardness Extracted | pH |
| 0 | 90.00 | 13.3 | 0.0 | |
| 2 | 65.32 | 9.6 | 27.4 | |
| 5 | 63.87 | 9.4 | 29.0 | |
| 10 | 58.06 | 8.6 | 35.5 | |
| 20 | 47.90 | 7.1 | 46.8 | |
| 30 | 44.53 | 6.6 | 50.0 | |

Examples XII and XIII further demonstrate the increased emulsion stability of the softening agent when $C_{52}$ complexing agent is present in the organic solvent phase. The data demonstrates the extent of emulsion break up when the softening agent is exposed to a high shear environment. This emulsion break up is measured by analyzing the bulk aqueous phase for $SO_4^{-2}$ ions. The $SO_4^{-2}$ ions are initially present in the inner aqueous phase of the softening agent. The experiments demonstrate that the $C_{52}$ complexing agent, which is also a surfactant, acts synergistically with the Paranox 105 surfactant in order to increase the softening agent emulsion stability.

EXAMPLE XII

A liquid softening agent was prepared having the following composition.

75 Vol.-% Organic Solvent Phase:

0.1 M $C_{52}$ complexing agent surfactant, bis(hexadecyl) phosphate, wherein $R=C_{26}$ and the total number of carbon atoms in the complexing agent is 52.

4.0 wt-% polyethyleneimine derivative of polyalkenyl substituted succinimide, M.W. about 2000, Paranox 105, Exxon Corporation surfactant Balance Kaydol ®, a light mineral oil, available from Witco Chemical Corporation.

25 Vol. % Inner Aqueous Acidic Phase:

24 N $H_2SO_4$ in deionized water

The softening agent was prepared according to the method of Example V. The procedure utilized in subjecting the emulsion to a high shear environment was the same as Example V. The following table shows the extent to which $SO_4^=$ ions leaked from the inner aqueous phase into the bulk aqueous phase.

TABLE L

| Time (Min.) | ppm of $SO_4^=$ in Bulk Aqueous Phase | Mole % of Available $SO_4^=$ Leaked into Bulk Aqueous Phase |
|---|---|---|
| 0.0 | 16.6 | 0.0 |
| 2.0 | 392 | 69.3 |
| 5.0 | 438 | 77.6 |
| 10.0 | 346 | 61.1 |
| 20.0 | 362 | 63.9 |

EXAMPLE XIII

A liquid softening agent was prepared having the following composition according to the method of Example V except that no complexing agent was added to the exterior organic phase.

75 Vol.-% Organic Solvent Phase:

96 wt-% Kaydol ®, a light mineral oil available from Witco Chemical Corporation.

4.0 wt-% polyethyleneimine derivative of polyalkenyl substituted succinimide, M.W. about 2000, Paranox 105, Exxon Corporation surfactant.

25 Vol-% Inner Aqueous Acidic Phase:

24 N $H_2SO_4$ in deionized water

The procedure utilized in subjecting the emulsion to a high shear environment was the same as Example V.

The following table shows the extent to which $SO_4^=$ ions leaked from the inner aqueous phase into the bulk aqueous phase.

TABLE M

| Min. (Time) | ppm of $SO_4^=$ in Bulk Aqueous Phase | Mole % of Available $SO_4^=$ Leaked into Bulk Aqueous Phase |
|---|---|---|
| 0.0 | 17.7 | 0.0 |
| 2.0 | 506 | 90.1 |
| 5.0 | 552 | 98.5 |
| 10.0 | 639 | 100 |
| 20.0 | 565 | 100 |

Virtually all of the available $SO_4^=$ leaked out of the emulsion in 20 minutes as compared with 64% in Example XII, indicating that an emulsion with no $C_{52}$ complexing agent is less stable than one containing the complexing agent.

EXAMPLE XIV

This example demonstrates the formation of a solid cast detergent composition containing the softening agent of the present invention. The following ingredients were included in the solid cast detergent composition:

| Ingredients | Wt % | Grams |
|---|---|---|
| 50% NaOH | 13.22% | 264.49 |
| Deionized Water | 2.42% | 48.32 |
| Caustic Beads | 35.60% | 712.09 |
| Dense Ash | 22.38% | 447.60 |
| 1-Hydroxyethylidene-1, 1-diphosphonic acid 60% active | 0.12% | 2.50 |
| Polyacrylic acid with a molecular weight of 4000, 50% active | 0.63% | 12.50 |
| Sodium salt of polyacrylic acid, 45% active | 0.63% | 12.50 |
| Softening Agent | 25.00% | 500.00 |

The softening agent utilized in the above solid cast composition is described in Example V. The above ingredients, except for the softening agent, were added to a 4000 ml beaker in the order listed, with the temperature kept at 150°-190° F. in order to keep the mixture liquid. The beaker was placed in a 135°-140° F. water bath. The agitator was set at 86 rpm. The softening agent was added at a rate of 330 grams/hour at a temperature of 146°-155° F. The mixing speed was increased to 100 rpm after 10 minutes had lapsed. The mixing speed was then increased to 120 rpm. The water bath temperature was still 138° F. at 40 minutes. At 40 minutes, the temperature of the molten mixture was 152°-153° F. The total addition time for the softening agent was 1 hour and 35 minutes. The final temperature of the composition was 155° F. The composition was then cooled to 146° F. before pouring. The entire composition was then poured into a cast mold and was allowed to cool for 30 minutes until it hardened.

EXAMPLE XV

The following example sets forth an experiment which demonstrates the softening results of the solid cast detergent block of Example XIV in hard water. A 7.04 gram sample of the solid cast detergent block of Example XII was inserted in a beaker containing 880 milliliters of hard water. The following table sets forth the percentage of hardness ions extracted.

| Time | Total Grains per Gallon as CaCO$_3$ | pH | Wt % of Hardness Extracted |
|---|---|---|---|
| 0.0 | 13.3 | 12.0 | 0.0 |
| 2.0 | 9.6 | 12.0 | 28.1 |
| 5.0 | 8.9 | 12.0 | 33.0 |
| 10.0 | 9.2 | 12.0 | 31.3 |
| 20.0 | 9.2 | 12.0 | 31.3 |

EXAMPLE XVI

The following experiments were conducted in order to determine the solubility of the complexing agent in the bulk aqueous phase. The experiments involved the determination of the solubility of $C_{16}$, $C_{20}$ and $C_{26}$ complexing agents in the bulk aqueous phase. The experiments indicate that the $C_{26}$ complexing agent was the least soluble in the bulk aqueous phase whereas the $C_{20}$ complexing agent and the $C_{16}$ were more soluble and the $C_{16}$ complexing agent was the most soluble in the bulk aqueous phase.

The procedure utilized was as follows:
5000 ppm of each softening agent was dispersed in water buffered at a pH ranging from 7.2 to 7.6 by the use of a Tris buffer. Samples were taken of the buffered water containing the softening agent at various time intervals, filtered carefully, and analyzed for phosphorous content. Any phosphorous detected by means of inductively coupled argon plasma (ICAP) analysis had to come from the complexing agent, which was present at a concentration of 0.5 moles/liter in the oil phase. The oil phase also contained 2 wt-% Paranox 105 surfactant available from Exxon Corporation and the balance Klearol ® Mineral Oil.

The softening agent containing the $C_{16}$ complexing agent had 50 vol-% of 6 N HCl as an inner aqueous phase and 50 vol-% oil phase.

Figure 2:
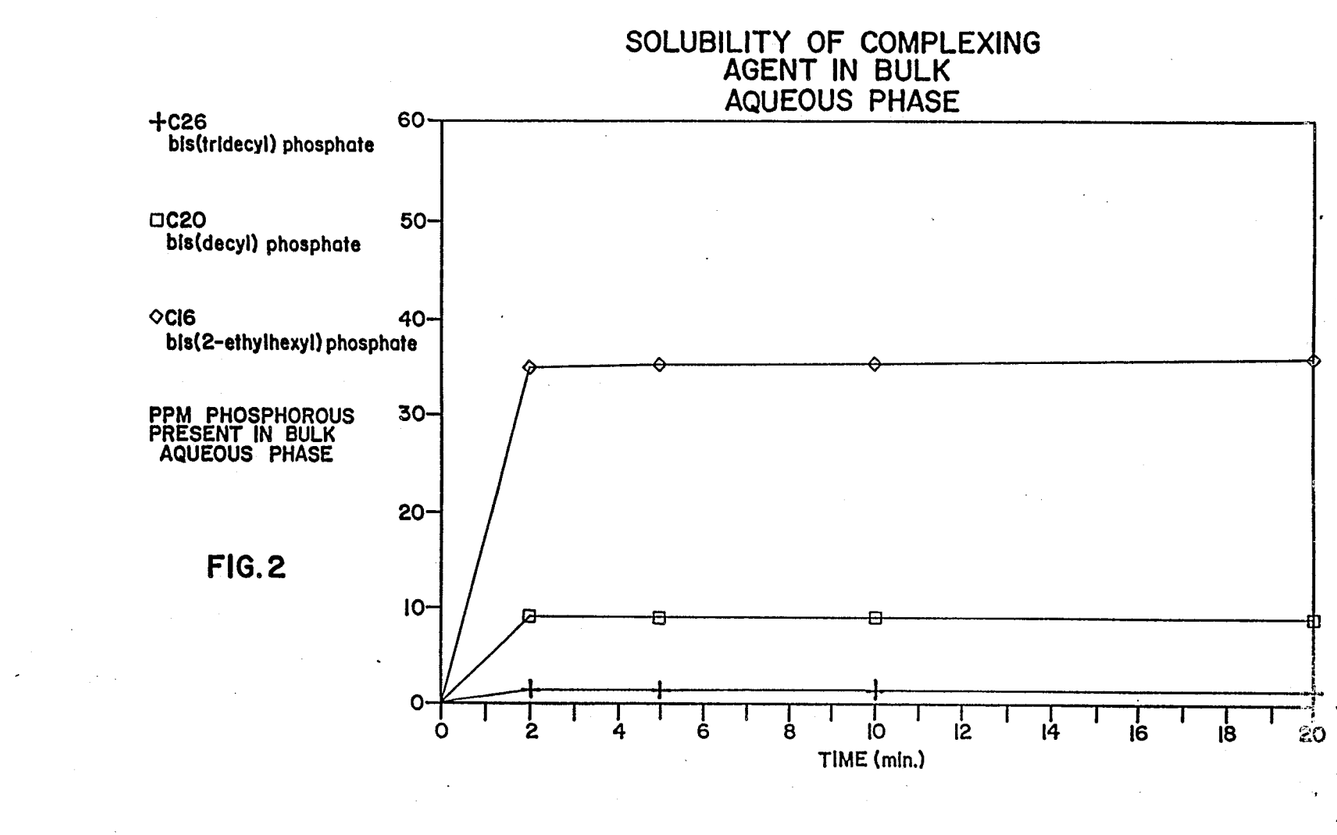
FIG. 2 is a graph demonstrating a reduction of leaching of complexing agent into the bulk aqueous phase when a high carbon containing complexing agent is used.

The $C_{26}$ and $C_{20}$ containing softening agents both contained 50 vol-% of 12 N H$_2$SO$_4$ as the inner aqueous phase and 50 vol-% of the same oil phase as described above for the softening agent containing the $C_{16}$ complexing agent in the oil phase. If all the complexing agent leached out into bulk aqueous phase, the phosphorous content maximum would be 40 parts per million. These examples demonstrate that most of the $C_{16}$ complexing agent leaches into the bulk aqueous phase, but only a fraction of the $C_{20}$ and $C_{26}$ complexing agents leach out, demonstrating the improved properties of the higher carbon containing complexing agent. (See FIG. 2)

While the invention has been explained fully in the detailed discussion found above of the specific embodiments of the invention, many embodiments of the invention can be made without departing from the spirit and scope of the invention. The invention resides in the claims hereinafter appended.

We claim:
1. A detersive system, that can remove divalent or trivalent ions from service water and can clean soiled surfaces or articles, comprising:
 (a) an effective detersive amount of a soil removing detergent;
 (b) an effective amount of a hardness sequestering agent, dispersed in the detergent, which hardness sequestering agent comprises:
  (1) about 25 to 95 vol.-% of an exterior organic phase having:
   (i) an organic medium; and
   (ii) about 0.1 to 99 wt-% based on the organic phase of an organic soluble hardness ion complexing agent comprising a molecule according to the formula:

wherein each R is independently a $C_{10-36}$ aliphatic group;
  (2) about 5 to 75 vol.-% of an inner aqueous phase dispersed within the exterior organic medium which comprises:
   (i) water; and
   (ii) about 0.5 to 99 wt-% based on the aqueous phase of an acid or strongly ionized salt; and
  (3) about 0.1 to 50 wt-% based on the organic phase of a surfactant that can stabilize the dispersed aqueous phase within the exterior organic phase.

2. The detersive system of claim 1 wherein the softening agent comprises droplets having a droplet size of about 0.5 to 2,000 microns.

3. The detersive system of claim 1 wherein the softening agent comprises droplets having a droplet size of about 1 to 1,000 microns.

4. The detersive system of claim 1 wherein the detersive system is a solid.

5. The detersive system of claim 4 wherein the solid is a cast solid.

6. The detersive system of claim 1 wherein the detersive system is a liquid.

7. The detersive system of claim 1 wherein the soil removing detergent comprises a surfactant selected from the group consisting of nonionic surfactant, cationic surfactant, and anionic surfactant and mixtures thereof.

8. The detersive system of claim 1 wherein the soil removing detergent comprises an inorganic detergent selected from the group consisting of an alkaline metal silicate, an alkaline metal hydroxide, an alkaline metal carbonate, an alkaline metal bicarbonate, and mixtures thereof.

9. The detersive system of claim 2 wherein the organic medium is selected from the group consisting of an aromatic hydrocarbon, a naphthenic hydrocarbon, a paraffinic hydrocarbon, a petroleum white oil, a wax, a silicone oil, a halogenated hydrocarbon, a fatty acid, and mixtures thereof.

10. The detersive system of claim 1 wherein the acid, of inner aqueous phase, is selected from the group consisting of hydrochloric acid, sulfuric acid, phosphoric acid, a carboxylic acid compound, and mixtures thereof.

11. The detersive system of claim 1 wherein the ionized salt is a neutralization reaction product of a base and an acid.

12. The detersive system of claim 6 wherein the surfactant that can stabilize the dispersed inner aqueous phase comprises an alkyl substituted polyethyleneimine or alkyl substituted amine.

13. A warewashing detersive system, capable of removing soil from flatware, dishware or other hard surfaces and capable of removing divalent or trivalent ions from service water, comprising:
   (a) about 0.1 to 95 wt-% of a source of an inorganic alkaline detergent;
   (b) about 2 to 60 wt-% of a hardness sequestering agent dispersed in the detersive system, which hardness sequestering agent comprises:
      (1) about 25 to 95 vol.-% of an exterior organic phase comprising a major proportion of an organic medium and about 0.5 to 50 wt-% of an organic soluble hardness ion complexing agent comprising a molecule according to the formula:

wherein each R is independently a $C_{10-36}$ alkyl group;
      (2) about 5 to 75 vol.-% of an inner aqueous phase dispersed within the exterior organic medium which comprises water and about 0.5 to 99 wt-% of an acid or strongly ionized salt; and
      (3) about 0.1 to 50 wt-%, based on the organic phase, of a surfactant to stabilize the dispersed inner aqueous phase within the exterior organic phase; and
   (c) about 0.1 to 25 wt-% of a source of active halogen.

14. The detersive system of claim 13 wherein the alkaline detergent comprises an alkali metal carbonated, an alkali metal bicarbonate, an alkali metal silicate, an alkali metal hydroxide, or mixtures thereof.

15. The detersive system of claim 13 wherein the source of active halogen comprises an alkali metal hypohalide, an alkali metal dihaloisocyanurate, a halogenated alkali metal tripolyphosphate or mixtures thereof.

16. The detersive system of claim 13 wherein the dispersed softening agent comprises droplets having a droplet size of about 0.05 to 2,000 microns.

17. The detersive system of claim 13 wherein the dispersed liquid softening agent comprises droplets having a droplet size of about 1 to 1,000 microns.

18. The detersive system of claim 13 wherein the detersive system is a particulate solid or a cast solid.

19. The detersive system of claim 13 wherein the dispersive system is a liquid.

20. The detersive system of claim 13 wherein the organic medium is selected from the group consisting of an aromatic hydrocarbon, a naphthenic hydrocarbon, a paraffinic hydrocarbon, a petroleum white oil, a wax, a silicone oil, a halogenated hydrocarbon, a fatty acid and mixtures thereof.

21. The detersive system of claim 13, wherein the inner aqueous phase acid is selected from the group consisting of hydrochloric acid, sulfuric acid, phosphoric acid, a carboxylic acid compound and mixtures thereof.

22. The detersive system of claim 15 wherein the ionized salt is a neutralization reaction product of a base and an acid.

23. An agent for removing hardness from an aqueous phase comprising:
   (a) about 5 to 95 vol.-% of an exterior organic phase having:
      (i) an organic medium; and
      (ii) about 25 to 99 wt-% based on the organic phase of an organic soluble hardness ion complexing agent comprising a molecule according to the formula:

wherein R is independently a $C_{10-36}$ aliphatic group;
   (b) about 5 to 75 vol.-% of an inner aqueous phase dispersed within the exterior organic phase which comprises:
      (i) water; and
      (ii) about 0.5 to 99 wt-% based on the aqueous phase of an acid or strongly ionized salt; and
   (c) about 0.1 to 50 wt-% based on the organic phase of a surfactant that can stabilize the dispersed aqueous phase within the exterior organic phase.

24. The agent of claim 23 wherein the organic medium is a liquid at room temperature.

25. The agent of claim 23 wherein the organic medium is a solid at room temperature.

26. The agent of claim 23 wherein the acid comprises sulfuric acid.

27. The agent of claim 23 wherein the ionized salt comprises the neutralization reaction product of an acid and a base.

28. The softening agent of claim 23 wherein the organic medium is selected from the group consisting of a naphthenic hydrocarbon, a paraffinic hydrocarbon, petroleum white oil, a wax, a silicone oil, a halogenated paraffin, a fatty acid, and mixtures thereof.

29. The agent of claim 23 wherein each R of the complexing agent is a $C_{16-30}$ alkyl group.

30. The agent of claim 29 wherein R is a $C_{26}$ alkyl group.

31. A detersive system, that can remove divalent or trivalent ions from service water and can clean soiled surfaces or articles, comprising:
   (a) an effective detersive amount of a soil removing detergent;
   (b) an effective amount of a hardness sequestering agent, dispersed in the detergent, which hardness sequestering agent comprises:
      (1) about 25 to 95 vol.-% of an exterior organic phase having:
         (i) an organic medium; and
         (ii) about 0.1 to 99 wt-% based on the organic phase of an organic soluble hardness ion complexing agent comprising a molecule according to the formula:

wherein each R is independently a branched $C_{10-36}$ aliphatic group;

(2) about 5 to 75 vol.-% of an inner aqueous phase dispersed within the exterior organic medium which comprises:
(i) water; and
(ii) about 0.5 to 99 wt-% based on the aqueous phase of an acid or strongly ionized salt; and

(3) about 0.1 to 50 wt-% based on the organic phase of a surfactant that can stabilize the dispersed aqueous phase within the exterior organic phase.

32. A warehousing detersive system, capable of removing soil from flatware, dishware or other hard surfaces and capable of removing divalent or trivalent ions from service water, comprising:

(a) about 0.1 to 95 wt-% of a source of an inorganic alkaline detergent;

(b) about 2 to 60 wt-% of a softening agent dispersed in the detersive system, which hardness sequestering agent comprises:

(1) about 25 to 95 vol.-% of an exterior organic phase comprising a major proportion of an organic medium and about 0.5 to 50 wt-% of an organic soluble hardness ion complexing agent comprising a molecule according to the formula:

wherein each R is independently a branched $C_{10-36}$ alkyl group;

(2) about 5 to 75 vol.-% of an inner aqueous phase dispersed within the exterior organic medium which comprises water and about 0.5 to 99 wt-% of an acid or strongly ionized salt; and (3) about 0.1 to 50 wt-%, based on the organic phase, of a surfactant to stabilize the dispersed inner aqueous phase within the exterior organic phase; and (c) about 0.1 to 25 wt-% of a source of active halogen.

33. An agent for removing hardness from an aqueous phase comprising:

(a) about 5 to 95 vol.-% of an exterior organic phase having:
(i) an organic medium; and
(ii) about 25 to 99 wt-% based on the organic phase of an organic soluble hardness ion complexing agent comprising a molecule according to the formula:

wherein each R is independently a branched $C_{20-36}$ aliphatic group;

(b) about 5 to 75 vol.-% of an inner aqueous phase dispersed within the exterior organic phase which comprises:
(i) water; and
(ii) about 0.5 to 99 wt-% based on the aqueous phase of an acid or strongly ionized salt; and (c) about 0.1 to 50 wt-% based on the organic phase of a surfactant that can stabilize the dispersed aqueous phase within the exterior organic phase.

* * * * *

UNITED STATES PATENT AND TRADEMARK OFFICE
CERTIFICATE OF CORRECTION

PATENT NO. : 4,971,714
DATED : Nov. 20, 1990
INVENTOR(S) : Lokkesmoe, et al.

It is certified that error appears in the above-identified patent and that said Letters Patent is hereby corrected as shown below:

At column 11, page 66, please delete "1-40" and substitute therefore --2-40--.
At column 25, line 13, please delete "warehousing" and substitute therefore --warewashing--.
At column 22, line 40, please delete "0.5" and substitute therefore --0.05--.
At column 23, line 42, please delete "carbonated" and substitute therefore --carbonate--.
At column 23, line 59, please delete "dispersive" and substitute therefore --detersive--.

Signed and Sealed this

Fourth Day of August, 1992

Attest:

DOUGLAS B. COMER

*Attesting Officer*  *Acting Commissioner of Patents and Trademarks*